US012790117B2

(12) United States Patent
Kim et al.

(10) Patent No.: US 12,790,117 B2
(45) Date of Patent: Nov. 10, 2026

(54) CEILING STORAGE SYSTEM

(71) Applicant: Samsung Electronics Co., Ltd., Suwon-si (KR)

(72) Inventors: Young Wook Kim, Suwon-si (KR); Seung Gyu Kang, Suwon-si (KR); Hyun Jae Kang, Suwon-si (KR); Sang Min Kim, Suwon-si (KR); Jae Sung Byun, Suwon-si (KR); Yong-Jun Ahn, Suwon-si (KR); Hyun Woo Lee, Suwon-si (KR); Jeong Hun Lim, Suwon-si (KR); Jun Hyuk Chang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 293 days.

(21) Appl. No.: 18/391,759

(22) Filed: Dec. 21, 2023

(65) Prior Publication Data

US 2024/0383679 A1 Nov. 21, 2024

(30) Foreign Application Priority Data

May 17, 2023 (KR) ........................ 10-2023-0063885

(51) Int. Cl.
*B65G 1/04* (2006.01)
*B61B 3/02* (2006.01)

(52) U.S. Cl.
CPC .............. *B65G 1/0464* (2013.01); *B61B 3/02* (2013.01)

(58) Field of Classification Search
CPC ........... B65G 1/0464; B61B 3/02; B61B 5/02; B61B 10/025; B61B 3/00; B61B 12/02;
(Continued)

(56) References Cited

U.S. PATENT DOCUMENTS

| | | | | |
|---|---|---|---|---|
| 1,752,026 A * | 3/1930 | Ellis | B66C 9/16 | 212/73 |
| 2,355,863 A * | 8/1944 | Harris | B66C 7/00 | 125/30.01 |

(Continued)

FOREIGN PATENT DOCUMENTS

| | | | | |
|---|---|---|---|---|
| CN | 115159013 A | | 10/2022 | |
| JP | H08259176 A | * | 10/1996 | H10P 72/3221 |

(Continued)

*Primary Examiner* — Gregory W Adams

(74) *Attorney, Agent, or Firm* — Wolf, Greenfield & Sacks, P.C.

(57) ABSTRACT

A ceiling storage system includes a first support rail and a second support rail that extend in a first direction; a first driving rail that extends in the first direction and is parallel to the first support rail and the second support rail; a second driving rail movably coupled to the first support rail, the second support rail, and the first driving rail, where the second driving rail is configured to move along the first support rail, the second support rail, and the first driving rail; a transfer vehicle movably coupled to the second driving rail and configured to move along the second driving rail; and a connection device that connects the first driving rail and the second driving rail to each other, where the connection device and the second driving rail are rotatable around a first axis that is parallel to the first direction.

20 Claims, 9 Drawing Sheets

(58) Field of Classification Search
CPC ....... B61B 10/022; E01B 25/22; E01B 25/24; E01B 26/00; B66C 7/00; B66C 2700/012
USPC ........ 104/89, 94, 124, 91, 95; 105/148, 146, 105/29.1, 145; 212/312, 346, 315, 324
See application file for complete search history.

(56) References Cited

U.S. PATENT DOCUMENTS

| | | | | | |
|---|---|---|---|---|---|
| 2,845,877 | A * | 8/1958 | Walter | B66C 7/00 105/156 |
| 2,884,871 | A * | 5/1959 | Mazzola | B66C 7/00 105/156 |
| 3,468,264 | A * | 9/1969 | Horompo | B66C 7/14 104/98 |
| 4,243,147 | A * | 1/1981 | Twitchell | A61G 7/1042 212/327 |
| 4,378,072 | A * | 3/1983 | Appleman | B66C 19/005 212/324 |
| 4,425,071 | A * | 1/1984 | Dunbar | B60P 1/5442 212/315 |
| 4,454,818 | A * | 6/1984 | Eccleston | E04G 3/28 212/346 |
| 5,788,096 | A * | 8/1998 | Wilcox | B66C 5/02 212/312 |
| 7,455,188 | B2 * | 11/2008 | Kahlman | B66C 13/18 212/321 |
| 7,462,138 | B2 * | 12/2008 | Shetty | A61H 3/008 482/69 |
| 7,850,026 | B2 * | 12/2010 | McKay | B66C 17/00 104/111 |
| 10,099,902 | B1 * | 10/2018 | Dixon | B61B 3/00 |
| 2016/0126120 | A1 * | 5/2016 | Oza | G05B 19/4189 700/121 |
| 2021/0316967 | A1 | 10/2021 | Sun et al. | |
| 2022/0289492 | A1 | 9/2022 | Hsu et al. | |
| 2022/0332500 | A1 | 10/2022 | Masuda | |

FOREIGN PATENT DOCUMENTS

| | | | | |
|---|---|---|---|---|
| KR | 20190084926 | A | 7/2019 | |
| KR | 20190119846 | A | 10/2019 | |
| KR | 20200036963 | A | 4/2020 | |
| KR | 20220040554 | A | 3/2022 | |
| WO | WO-2022149397 | A1 * | 7/2022 | H10P 72/3221 |

* cited by examiner

CEILING STORAGE SYSTEM

CROSS-REFERENCE TO RELATED APPLICATION

This application claims priority from Korean Patent Application No. 10-2023-0063885 filed on May 17, 2023 in the Korean Intellectual Property Office, and all the benefits accruing therefrom under 35 U.S.C. 119, the contents of which in its entirety are herein incorporated by reference.

TECHNICAL FIELD

The present disclosure relates to a ceiling storage system.

BACKGROUND

As production of semiconductor devices increases rapidly, the storage capacity of a storage system installed inside a fab that produces the semiconductor devices may be insufficient. The insufficient storage capacity may be a factor that decreases the logistics efficiency of an entirety of the fab.

SUMMARY

A technical purpose to be achieved by the present disclosure is to provide a ceiling storage system with improved reliability.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

According to some aspects of the present disclosure, a ceiling storage system includes a first support rail and a second support rail that extend in a first direction; a first driving rail that extends in the first direction and is parallel to the first support rail and the second support rail; a second driving rail movably coupled to the first support rail, the second support rail, and the first driving rail, where the second driving rail is configured to move along the first support rail, the second support rail, and the first driving rail; a transfer vehicle movably coupled to the second driving rail and configured to move along the second driving rail; and a connection device that connects the first driving rail and the second driving rail to each other, where the connection device and the second driving rail are rotatable around a first axis that is parallel to the first direction.

According to some aspects of the present disclosure, a ceiling storage system comprises an overhead rack; a first support rail and a second support rail that are on the overhead rack and extend in a first direction; a first driving rail that is on the overhead rack, extends in the first direction, and is parallel to the first support rail and the second support rail; a second driving rail movably coupled to the first support rail, the second support rail, and the first driving rail, where the second driving rail is configured to move along the first support rail, the second support rail, and the first driving rail; a transfer vehicle movably coupled to the second driving rail, where the transfer vehicle is configured to move along the second driving rail and to transport an article to or from the overhead rack; and a connection device that connects the first driving rail and the second driving rail to each other, where the connection device together and the second driving rail are rotatable around a first axis that is parallel to the first direction.

According to some aspects of the present disclosure, a ceiling storage system comprises a first support rail and a second support rail that extends in a first direction; a first driving rail that extends in the first direction and is parallel to the first support rail and the second support rail; a second driving rail movably coupled to the first support rail, the second support rail, and the first driving rail, wherein the second driving rail is configured to move along the first support rail, the second support rail, and the first driving rail; a transfer vehicle movably coupled to the second driving rail and configured to move along the second driving rail; and a connection device that is on a center of the second driving rail and that connects the first driving rail and the second driving rail to each other, wherein the connection device includes: a fixed unit coupled to the first driving rail, a bushing rotatably coupled to the fixed unit and comprising a circular ring shape; and a rotatable unit coupled to the second driving rail and rotatably coupled to the bushing, wherein the rotatable unit and the second driving rail are rotatable around the bushing.

It should be noted that the effects of the present disclosure are not limited to those described above, and other effects of the present disclosure will be apparent from the following description.

BRIEF DESCRIPTION OF DRAWINGS

The above and other aspects and features of the present disclosure will become more apparent by describing in detail illustrative embodiments thereof with reference to the attached drawings, in which.

DETAILED DESCRIPTION

Figure 1:
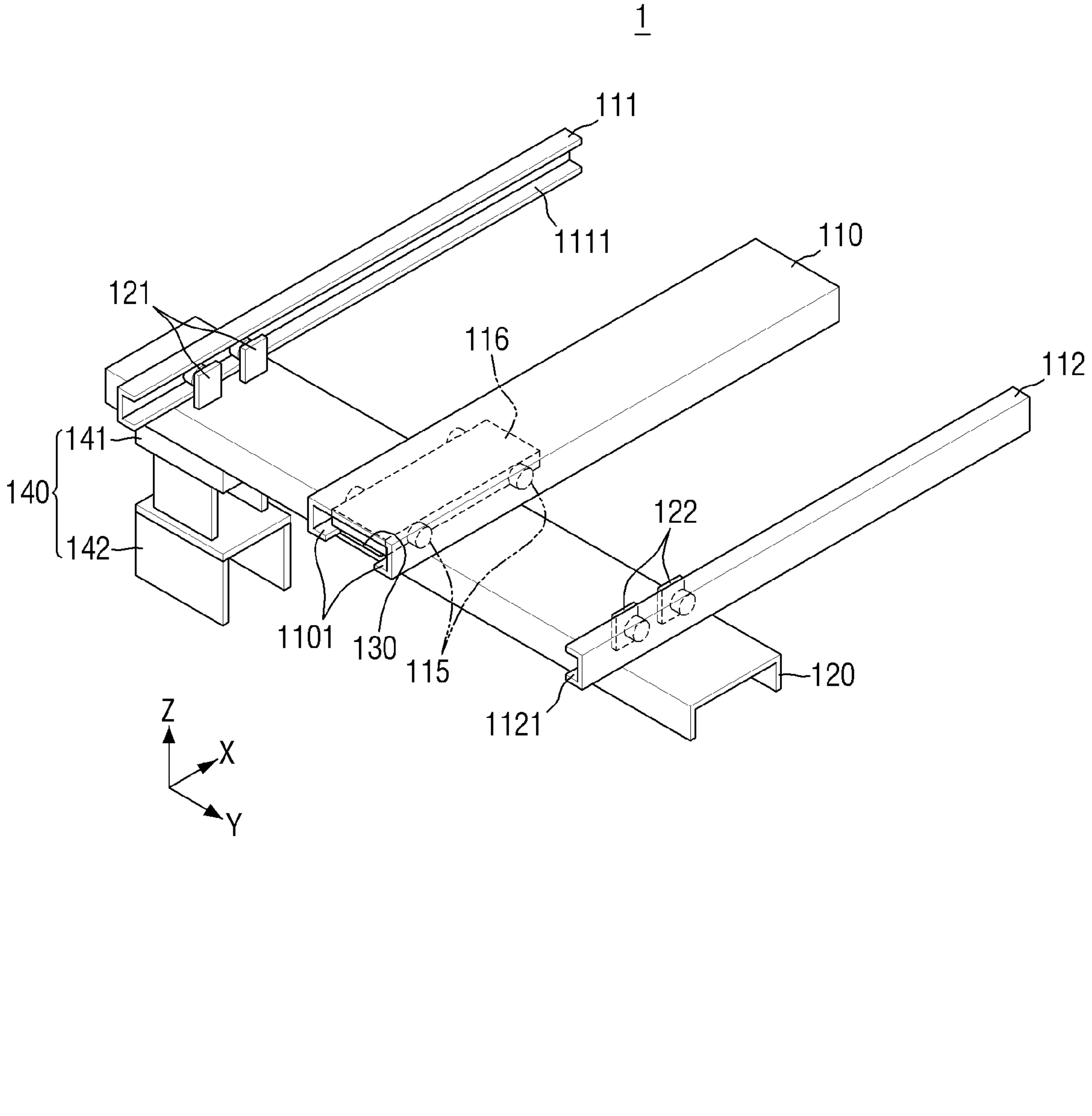
FIG. 1 is a perspective view showing a ceiling storage system according to some embodiments of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included in the idea and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms “a” and “an” are intended to include the plural forms as well, unless the context clearly indicates otherwise. It will be further understood that the terms “comprises”, “comprising”, “includes”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of the associated listed items. Expression such as “at least one of” when preceding a list of elements may modify the entirety of list of elements and may not modify the individual elements of the list. When referring to “C to D”, this means C inclusive to D inclusive unless otherwise specified.

It will be understood that, although the terms “first”, “second”, “third”, and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the idea and scope of the present disclosure.

In addition, it will also be understood that when a first element or layer is referred to as being present “on” or “beneath” a second element or layer, the first element may be disposed directly on or beneath the second element or may be disposed indirectly on or beneath the second element with a third element or layer being disposed between the first and second elements or layers. It will be understood that when an element or layer is referred to as being “connected to”, or “coupled to” another element or layer, it may be directly on, connected to, or coupled to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

Further, as used herein, when a layer, film, region, plate, or the like may be disposed “on” or “on a top” of another layer, film, region, plate, or the like, the former may directly contact the latter or still another layer, film, region, plate, or the like may be disposed between the former and the latter. As used herein, when a layer, film, region, plate, or the like is directly disposed “on” or “on a top” of another layer, film, region, plate, or the like, the former directly contacts the latter and still another layer, film, region, plate, or the like is not disposed between the former and the latter. Further, as used herein, when a layer, film, region, plate, or the like may be disposed “below” or “under” another layer, film, region, plate, or the like, the former may directly contact the latter or still another layer, film, region, plate, or the like may be disposed between the former and the latter. As used herein, when a layer, film, region, plate, or the like is directly disposed “below” or “under” another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as “after”, “subsequent to”, “before”, etc., another event may occur therebetween unless “directly after”, “directly subsequent” or “directly before” is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as “beneath,” “below,” “lower,” “under,” “above,” “upper,” and the like, may be used herein for ease of explanation to describe one element or feature’s relationship to another element or feature as illustrated in the figures. It will be understood that the spatially relative terms are intended to encompass different orientations of the apparatus in use or in operation, in addition to the orientation depicted in the figures. For example, when the apparatus in the drawings may be turned over, elements described as “below” or “beneath” or “under”

other elements or features would then be oriented "above" the other elements or features. Thus, the example terms "below" and "under" may encompass both an orientation of above and below. The apparatus may be otherwise oriented, for example, rotated 90 degrees or at other orientations, and the spatially relative descriptors used herein should be interpreted accordingly.

Hereinafter, embodiments according to the technical idea of the present disclosure will be described with reference to the accompanying drawings. The same reference numerals are used for the same components in the drawings, and duplicate descriptions thereof are omitted.

Figure 2:
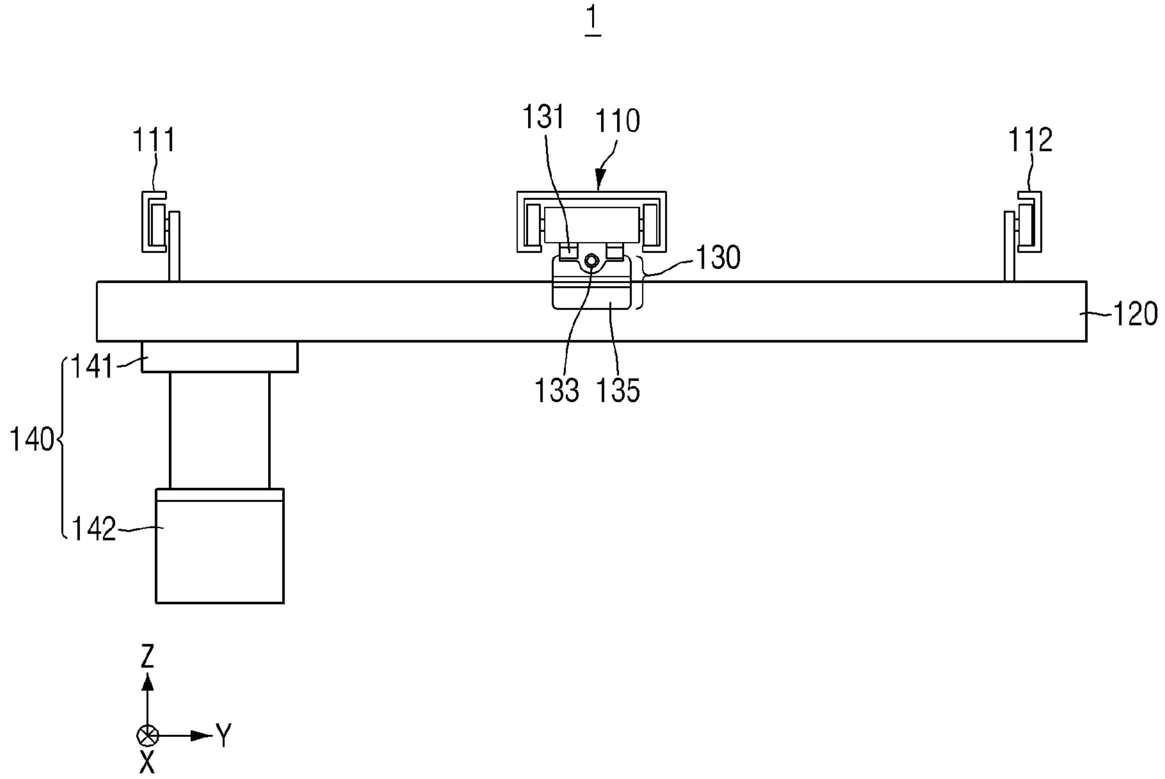
FIG. 2 is a front view showing a ceiling storage system according to some embodiments of the present disclosure.

FIG. 1 is a perspective view showing a ceiling storage system according to some embodiments of the present disclosure. FIG. 2 is a front view showing a ceiling storage system according to some embodiments of the present disclosure.

Referring to FIG. 1 and FIG. 2, a ceiling storage system 1 according to some embodiments of the present disclosure may include a first support rail 111, a second support rail 112, a first driving rail 110, a second driving rail 120, a connection device 130, a transfer vehicle 140, etc. In the ceiling storage system 1 according to some embodiments of the present disclosure, a cross type overhead hoist crane may be provided by the first driving rail 110 and the second driving rail 120, and the transfer vehicle 140 and may be configured to transport an article.

The first support rail 111 and the second support rail 112 may extend in an elongate manner in a first direction X. The first driving rail 110 may extend in parallel with the first support rail 111 and the second support rail 112. That is, the first driving rail 110 may extend in an elongate manner in the first direction X.

The first driving rail 110 may be disposed between the first support rail 111 and the second support rail 112. However, the present disclosure is not limited thereto. That is, the first support rail 111 may be located between the first driving rail 110 and the second support rail 112, or the second support rail 112 may be located between the first support rail 111 and the first driving rail 110.

The second driving rail 120 may be movably coupled to the first support rail 111, the second support rail 112, and the first driving rail 110. Accordingly, the second driving rail 120 may move along the first support rail 111, the second support rail 112, and the first driving rail 110. That is, the second driving rail 120 may move in the first direction X. Furthermore, the second driving rail 120 may contact and be on the first support rail 111, the second support rail 112, and the first driving rail 110 and thus be supported at three contact points. This will be described in more detail below.

Furthermore, the second driving rail 120 may extend in a direction different from the first direction X, for example, in a second direction Y perpendicular to the first direction X.

Furthermore, as shown in FIG. 1, a driving wheel (e.g., a wheel rotating under a driving force to move the second driving rail 120 in the first direction X) rotates while contacting the first driving rail 110. A guide wheel installed on the second driving rail 120 (that is, a wheel that does not receive the driving force) rotates while being in contact with the first support rail 111 and the second support rail 112. The guide wheel helps the second driving rail 120 move stably such that the second driving rail 120 is not inclined.

Referring to FIG. 1, in some embodiments, the second driving rail 120 may be disposed under the first driving rail 110, the first support rail 111, and the second support rail 112. On an upper surface of the second driving rail 120, a driving wheel 115, a first guide wheel 121 and a second guide wheel 122 are installed. A motor for providing the driving force to the driving wheel 115 may be connected to the driving wheel 115. An elongate groove 1101 is formed in a side surface of the first driving rail 110 and extends along the first direction X. The driving wheel 115 rotates while being received in the groove 1101 and moving along the groove 1101. An elongate groove 1111 is formed in a side surface of the first support rail 111 and extends along the first direction X. The first guide wheel 121 rotates while receiving in the groove 1111 and moving along the groove 1111. An elongate groove 1121 is formed in a side surface of the second support rail 112 and extends along the first direction X. The second guide wheel 122 rotates and moves along the groove 1121 while being received in the groove 1121.

As described above, the second driving rail 120 is movably coupled to the first driving rail 110, the first support rail 111, and the second support rail 112. Therefore, the second driving rail 120 is supported thereon at three contact points. That is, since a load of the second driving rail 120 is distributed to the three rails 110, 111, and 112, a load applied to each rail is reduced.

Furthermore, in the ceiling storage system 1 of the present disclosure, the first driving rail 110 and the second driving rail 120 are connected to each other via the connection device 130.

As shown in FIG. 2, the connection device 130 may be connected to the first driving rail 110 via a plurality of upper-end coupling members 131. More specifically, the connection device 130 may be connected to a movable robot 116 of the first driving rail 110 via the plurality of upper-end coupling members 131 while being disposed under the first driving rail 110.

Furthermore, the connection device 130 may be connected to the second driving rail 120 via a lower-end coupling member 135. For example, the connection device 130 may be connected to the second driving rail 120 via the lower-end coupling member 135 installed on an upper surface of the second driving rail 120.

That is, the connection device 130 may connect the first driving rail 110 and the second driving rail 120 to each other while being disposed between the first driving rail 110 and the second driving rail 120.

Furthermore, as shown in FIG. 1, the connection device 130 according to some embodiments of the present disclosure may include two connection devices 130 installed on an upper surface of the second driving rail 120. Thus, the second driving rail 120 may be connected to the first driving rail 110 via a pair of connection devices 130. A more detailed description of the connection device 130 will be described with reference to FIG. 3 and FIG. 4 below.

The transfer vehicle 140 may be movably coupled to the second driving rail 120. Accordingly, the transfer vehicle 140 may move along the second driving rail 120. That is, the transfer vehicle 140 may move in the second direction Y.

The transfer vehicle 140 may include a carriage 141, a grip unit 142, and the like.

The carriage 141 moves along the second driving rail 120. A driving wheel (not shown) (e.g., a wheel rotating under a driving force to move the carriage 141 in the second direction Y) installed on the carriage 141 may rotate while being in contact with the second driving rail 120.

The grip unit 142 is configured to stably fix the article being moved by the transfer vehicle 140. The grip unit 142 grips the article. For example, the grip unit 142 may be in a form of a gripper and may grip a predetermined area of the article.

Figure 3:
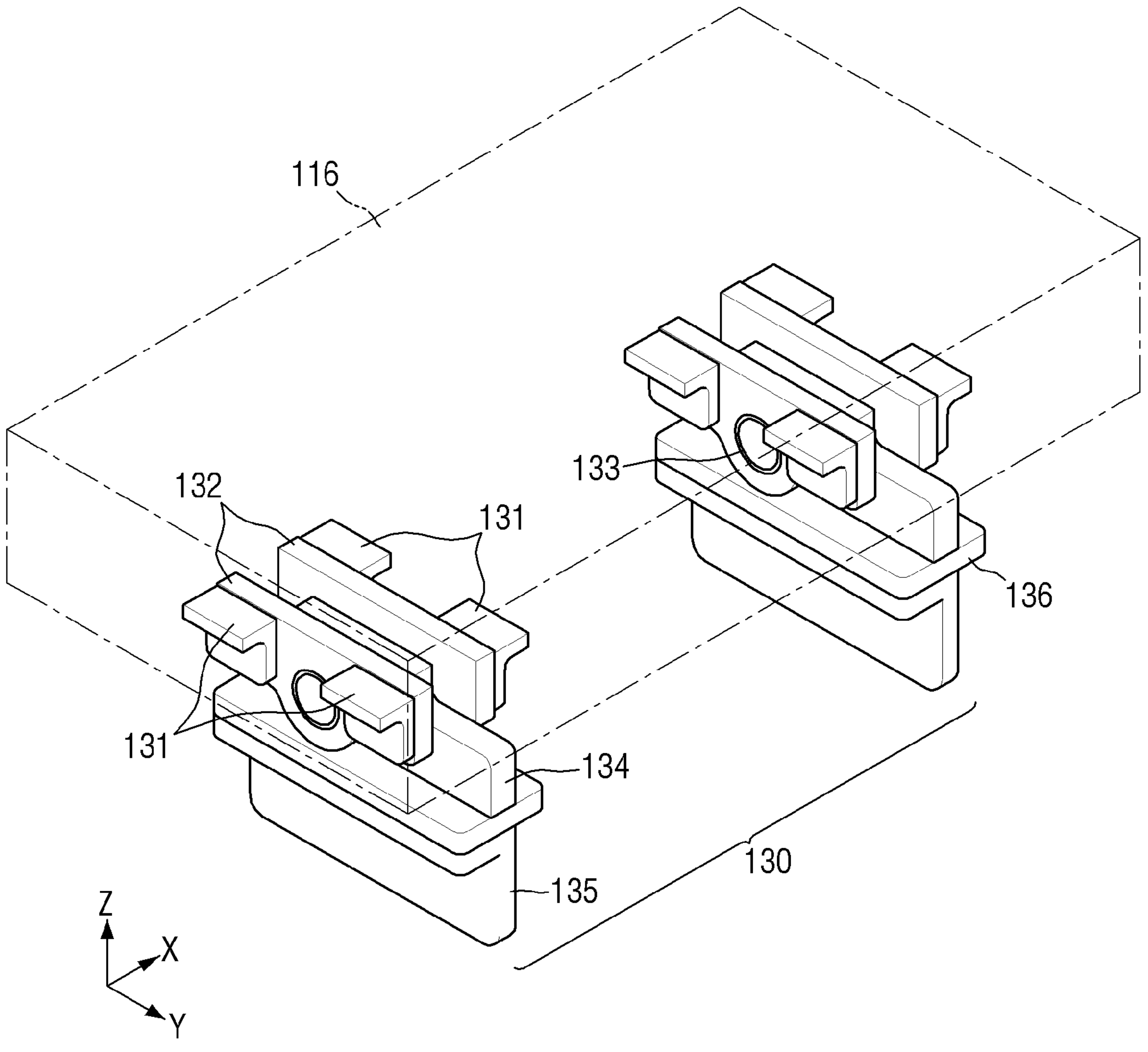
FIG. 3 is a perspective view showing the connection device of FIG. 1 in detail.
Figure 4:
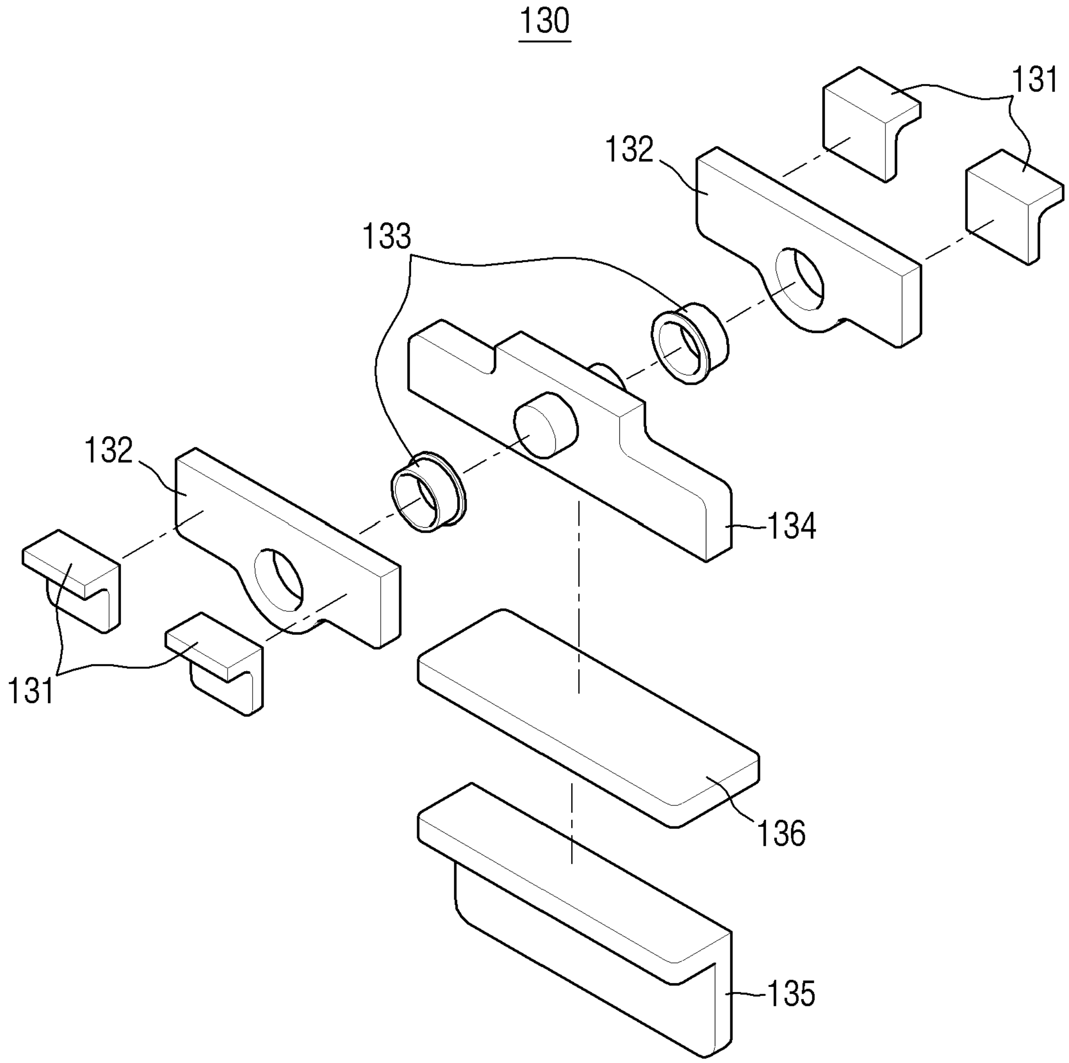
FIG. 4 is an exploded view that illustrates the connection device of FIG. 3.

FIG. 3 is a perspective view showing the connection device of FIG. 1 in detail. FIG. 4 is an exploded view for illustrating the connection device of FIG. 3.

Referring to FIGS. 3 and 4, the connection device 130 may include the plurality of upper-end coupling member 131, a connection member 132, a bushing 133, a shaft block 134, the lower-end coupling member 135, a plate 136, etc.

The plurality of upper-end coupling members 131 and the connection member 132 may be coupled to the movable robot 116 of the first driving rail 110. In some embodiments, the plurality of upper-end coupling members 131 may be fixedly coupled to the movable robot 116. For example, the plurality of upper-end coupling members 131 may be fastened by, for example, one or more screws, to the movable robot 116 while being disposed under the movable robot 116. Furthermore, in some embodiments, the connection member 132 may be fastened by, for example, one or more screws to the plurality of upper-end coupling members 131.

That is, when the movable robot 116 of the first driving rail 110 does not tilt in a left or right direction but is maintained in a level state in a lateral direction Y, the plurality of upper-end coupling members 131 and the connection member 132 (hereinafter, referred to as a fixed unit) may be maintained in a fixed state in the lateral direction Y.

The connection device 130 may include a bushing 133 that rotates about a first axis parallel to the first direction X. Some components (for example, the shaft block 134 and the lower-end coupling member 135, which will be described later) of the connection device 130 may rotate about the first axis based on the rotation of the bushing 133.

The bushing 133 may be coupled to the connection member 132 and the shaft block 134 while being disposed between the connection member 132 and the shaft block 134. For example, the bushing 133 having a circular cross-sectional shape may be fitted into a circular-shaped protrusion inside the shaft block 134 to be coupled to the shaft block 134. More specifically, the bushing 133 may be inserted into the circular protrusion with a smaller diameter than that of the bushing 133 to thereby be coupled to the shaft block 134. Furthermore, the connection member 132 may extend through and be at least partially within a circular hole inside the connection member 132 and may be coupled to the bushing 133. More specifically, the bushing 133 may be inserted into a circular hole having a larger diameter than that of the bushing 133 to thereby be coupled to the connection member 132.

The lower-end coupling member 135 and the plate 136 may be coupled to the second driving rail 120.

In some embodiments, the lower-end coupling member 135 may be fixedly coupled to the second driving rail 120 at a side surface of the second driving rail 120. For example, the lower-end coupling member 135 may be fastened by, for example, one or more screws to the second driving rail 120 at the side surface of the second driving rail 120.

The plate 136 may be fixedly coupled to the second driving rail 120 at an upper surface of the second driving rail 120. For example, the plate 136 may be fastened by, for example, one or more screws to the lower-end coupling member 135 and the second driving rail 120 at the upper surface of each of the lower-end coupling member 135 and the second driving rail 120.

In one example, the shaft block 134 may be fastened by, for example, one or more screws to the plate 136 at an upper surface of the plate 136. Accordingly, the shaft block 134, which is rotatably coupled to the bushing 133 rotating about the first axis parallel to the first direction X, may be fastened by, for example, one or more screws to the plate 136, which may be coupled to the second driving rail 120. Thus, the shaft block 134 may impart a rotational degree of freedom (e.g., being rotatable about the first axis) to the second driving rail 120. That is, the shaft block 134, the lower-end coupling member 135, and the plate 136 (hereinafter, a rotatable unit) may be fixedly coupled to the second driving rail 120 and may be rotatable about the first axis.

Figure 5:
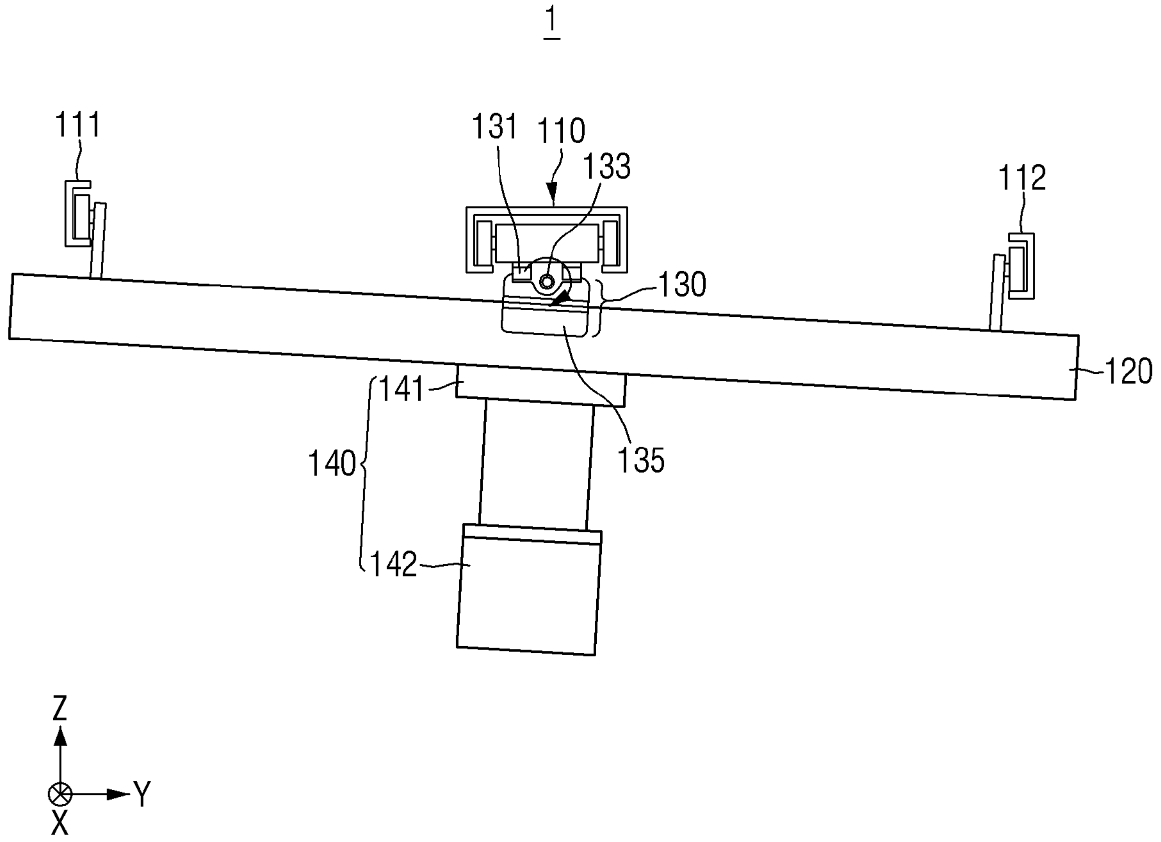
FIG. 5 is a diagram that illustrates an operation and an effect of the connection device according to some embodiments of the present disclosure.
Figure 6:
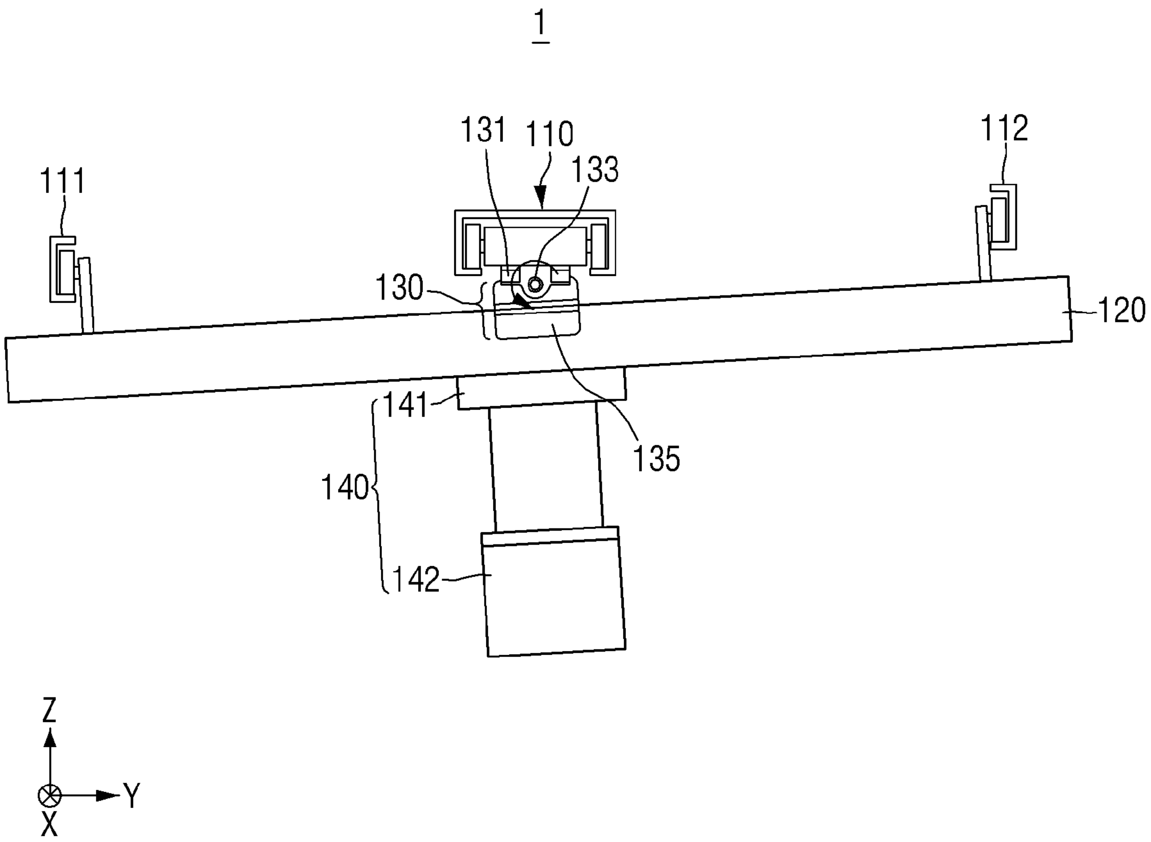
FIG. 6 is a diagram that illustrates an operation and an effect of the connection device according to some embodiments of the present disclosure.
Figure 7:
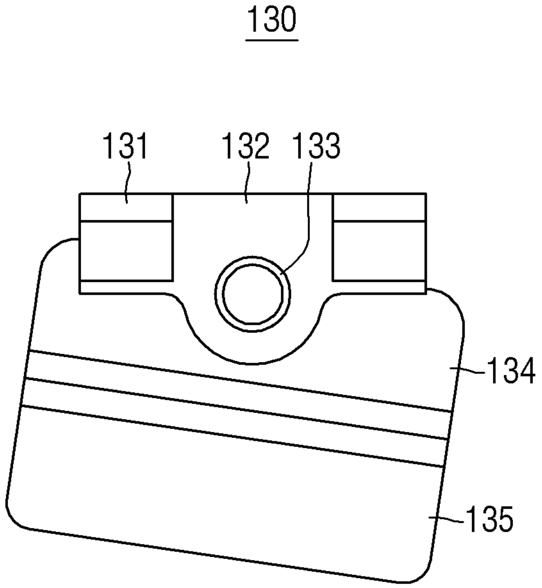
FIG. 7 is a diagram that illustrates the connection device of FIG. 5.
Figure 8:
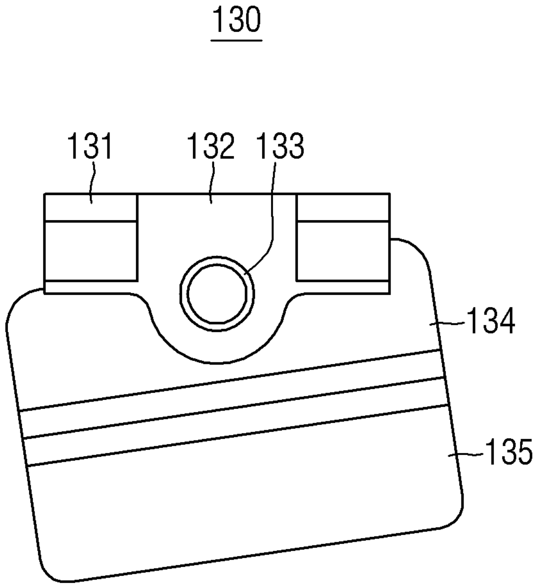
FIG. 8 is a diagram that illustrates the connection device of FIG. 6.

FIG. 5 is a diagram that illustrates an operation and an effect of the connection device according to some embodiments of the present disclosure. FIG. 6 is a diagram that illustrates an operation and an effect of the connection device according to some embodiments of the present disclosure. FIG. 7 is a diagram that illustrates the connection device of FIG. 5. FIG. 8 is a diagram that illustrates the connection device of FIG. 6.

Referring to FIGS. 5 and 7, in some embodiments, the ceiling storage system 1 comprising a plurality of rails may be in a state in which a difference between a vertical level of the first support rail 111 and a vertical level of the second support rail 112 is present during set-up. For example, as shown in FIG. 5, the ceiling storage system 1 may be in a state where the first support rail 111 is positioned at a higher position in the Z-direction than that of the second support rail 112 in the Z-direction during the set-up.

Accordingly, the ceiling storage system 1 including the connection device 130 according to the present disclosure may operate as follows to reduce the difference between the vertical levels of the first support rail 111 and the second support rail 112. The second driving rail 120 contacts the first driving rail 110, the first support rail 111 and the second support rail 112 and thus is supported thereon at the three contact points. Thus, as shown in FIG. 5, the connection device 130 coupled to the first driving rail 110 and the second driving rail 120 rotates the second driving rail 120 in a clockwise direction to reduce the difference between the vertical levels of the first support rail 111 and the second support rail 112.

More specifically, the fixed unit (i.e., the plurality of upper-end coupling members 131 and the connection member 132) of the connection device 130 is fixedly coupled to the first driving rail 110 and is maintained at a level state in the lateral direction Y. In one example, the rotatable unit (i.e., the shaft block 134 and the lower-end coupling member 135) of the connection device 130 is fixedly coupled to the second driving rail 120, which is tilted due to the difference between a vertical level of the first support rail 111 and a vertical level of the second support rail 112 and thus, is in a state in which the rotatable unit together with the second driving rail 120 have been rotated in a clockwise manner, as shown in FIG. 5.

Accordingly, the first driving rail 110 of the ceiling storage system 1 including the connection device 130 according to the present disclosure is less affected by stress or deformation due to the difference between the vertical levels of the first support rail 111 and the second support rail 112 and may be structurally stable.

Referring to FIGS. 6 and 8, in some embodiments, the ceiling storage system 1 comprising the plurality of rails may be in a state in which a difference between a vertical level of the first support rail 111 and a vertical level of the second support rail 112 is present during set-up. For example, as shown in FIG. 6, the ceiling storage system 1 may be in a state where the first support rail 111 is positioned at a lower position than that of the second support rail 112 during the set-up.

Accordingly, the ceiling storage system 1 including the connection device 130 according to the present disclosure may operate as follows to reduce the difference between the vertical levels of the first support rail 111 and the second support rail 112. The second driving rail 120 contacts the first driving rail 110, the first support rail 111 and the second support rail 112 and thus is supported thereon at the three contact points. Thus, as shown in FIG. 6, the connection device 130 coupled to the first driving rail 110 and the second driving rail 120 rotates the second driving rail 120 in a counterclockwise direction to reduce the difference between the vertical levels of the first support rail 111 and the second support rail 112.

More specifically, the fixed unit (i.e., the plurality of upper-end coupling members 131 and the connection member 132) of the connection device 130 is fixedly coupled to the first driving rail 110 and is maintained at a level state in the lateral direction Y. In one example, the rotatable unit (i.e., the shaft block 134 and the lower-end coupling member 135) of the connection device 130 is fixedly coupled to the second driving rail 120, which is tilted due to the difference between a vertical level of the first support rail 111 and a vertical level of the second support rail 112 and thus, is in a state in which the rotatable unit together with the second driving rail 120 have been rotated in the counterclockwise manner, as shown in FIG. 6.

Accordingly, the first driving rail 110 of the ceiling storage system 1 including the connection device 130 according to the present disclosure is less affected by stress or deformation due to the difference between the vertical levels of the first support rail 111 and the second support rail 112 and may be structurally stable.

As used herein, a "first rotational direction" may refer to one of a clockwise direction and a counterclockwise direction, and "a second rotational direction" may refer to an opposite rotational direction of the first rotational direction. For example, the first rotational direction may refer to the clockwise direction, and the second rotational direction may refer to the counterclockwise direction. As another example, the first rotational direction may refer to the counterclockwise direction, and the second rotational direction may refer to the clockwise direction.

Figure 9:
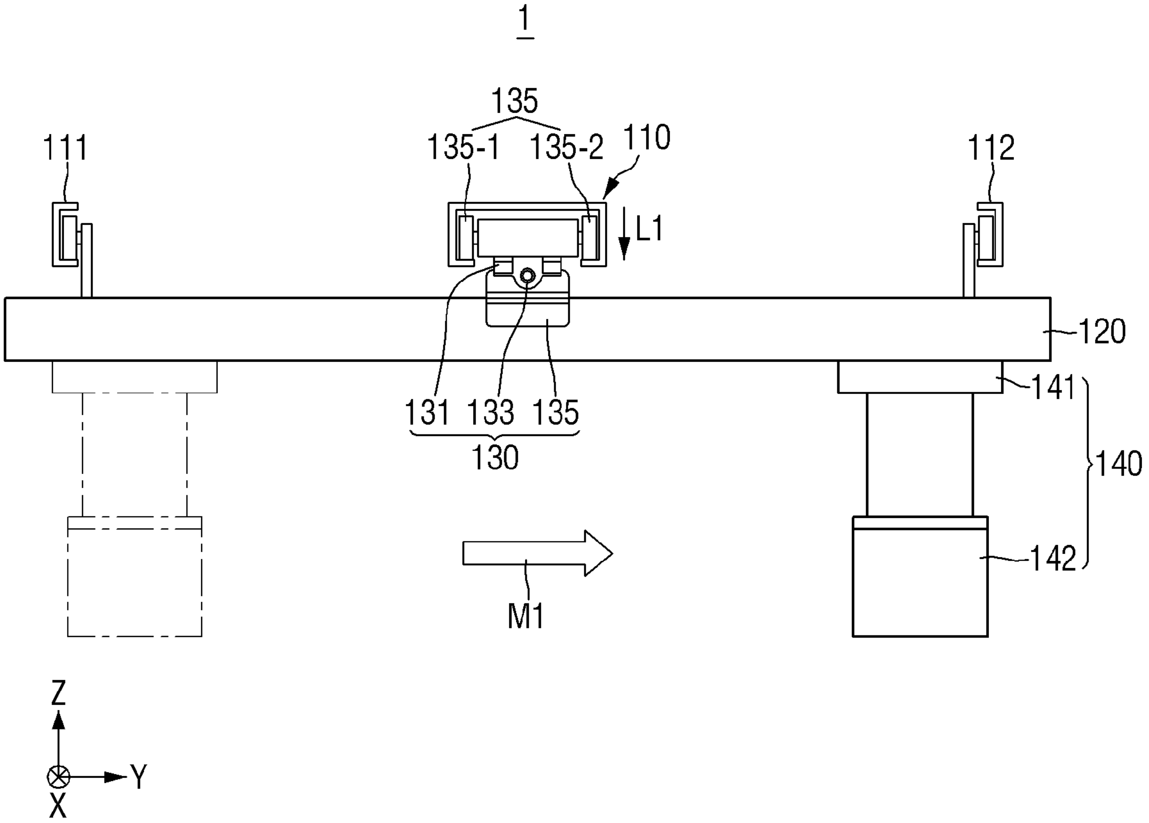
FIG. 9 is a diagram that illustrates an effect of the connection device according to some embodiments of the present disclosure.

FIG. 9 is a diagram for illustrating an effect of the connection device according to some embodiments of the present disclosure.

Referring to FIG. 9, in the ceiling storage system 1, as the transfer vehicle 140 moves along the second driving rail 120, a center of gravity of an entirety of the system may change. Accordingly, a grip force of the driving wheel 115 on the first driving rail 110 may change.

For example, as the transfer vehicle 140 moves in a direction of an arrow M1 along the second driving rail 120, the right driving wheel 115-2 of the first driving rail 110 receives a force acting in a direction L1. Accordingly, the grip force of the right driving wheel 115-2 on the first driving rail 110 may change. At this time, the connection device 130 according to the present disclosure is tilted in the L1 direction around the bushing 133 as an axis, thereby minimizing the change in the grip force of the right driving wheel 115-2. More specifically, the second driving rail 120 fixedly coupled to the lower-end coupling member 135 of the connection device 130 is tilted in the L1 direction around the bushing 133 as an axis, such that the change in the grip force of the right driving wheel 115-2 on the first driving rail 110 may be minimized.

The connection device 130 according to the present disclosure comprises independent parts including the fixed unit (for example, the plurality of upper-end coupling members 131) and the rotatable unit (for example, the lower-end coupling member 135). Even when the second driving rail 120 coupled to the rotatable unit is tilted in the L1 direction, the first driving rail 110 coupled to the fixed unit may be maintained at a level state in the lateral direction Y. That is, the change in the center of gravity of the system due to the transfer vehicle 140 moving along the second driving rail 120 may have a small effect on the change in the grip force of each of the driving wheels 115-1 and 115-2 on the first driving rail 110.

Furthermore, in FIG. 9, an example in which the transfer vehicle 140 moves in the direction of the arrow M1 is described. However, the present disclosure is not limited thereto. As the transfer vehicle 140 moves in a direction opposite to the direction of the arrow M1, the connection device 130 according to the present disclosure may minimize the change in the grip force of the left driving wheel 115-1 on the first driving rail 110.

Figure 10:
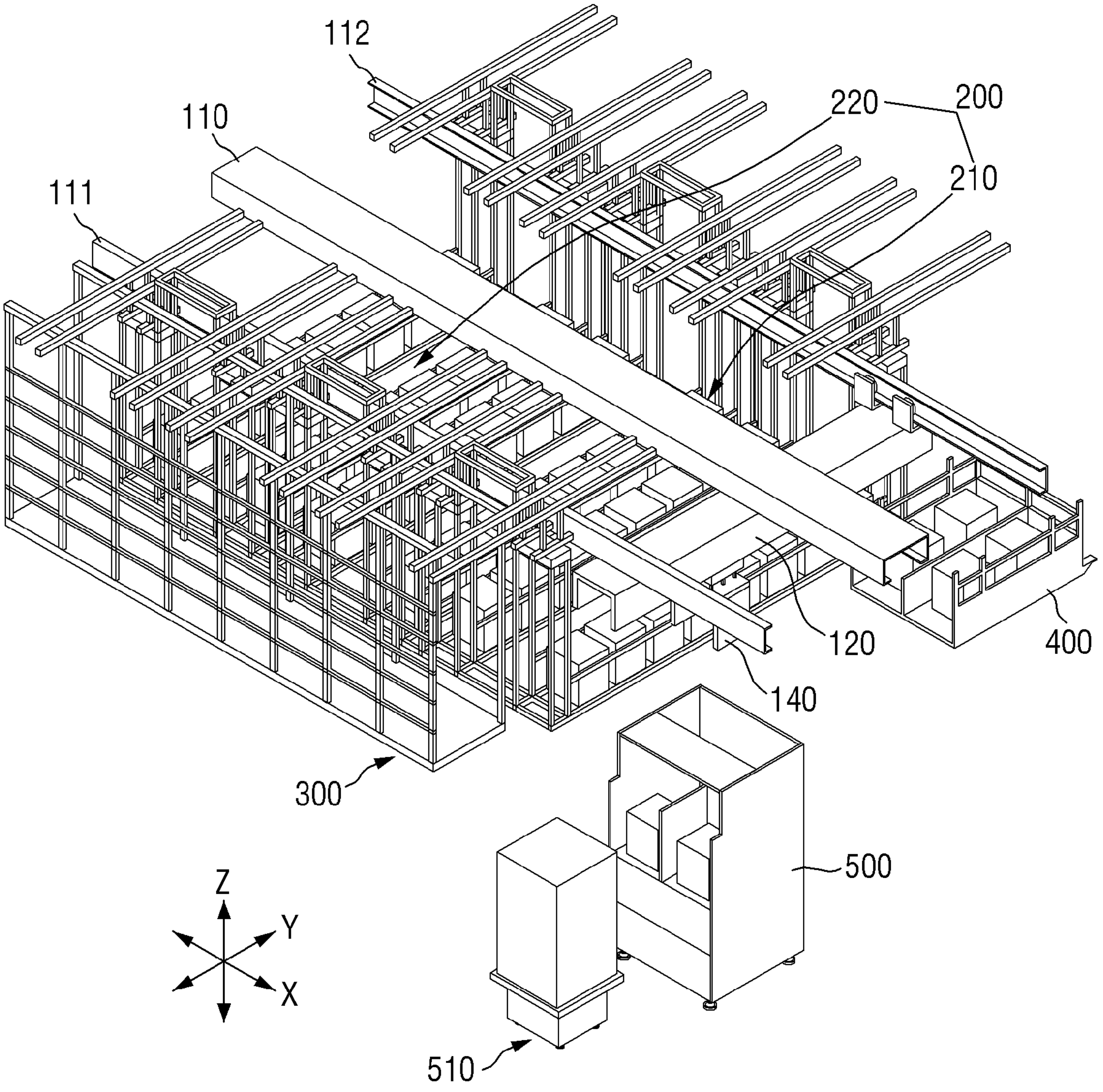
FIG. 10 is a perspective view showing a ceiling storage system according to another embodiment of the present disclosure.

FIG. 10 is a perspective view showing a ceiling storage system according to another embodiment of the present disclosure.

Referring to FIG. 10, optionally, the ceiling storage system according to some embodiments of the present disclosure may further include an overhead rack 200, an access passage 300, a first interface port 400, and a second interface port 500.

The overhead rack 200 includes multiple storage areas 210 for storing multiple articles therein. In this regard, the article may be a wafer receiving container (e.g., a Front Opening Unified Pod (FOUP)), a reticle receiving container, etc. However, the present disclosure is not limited thereto. The article may be anything that may be moved by a transfer vehicle/transfer device, etc.

In one example, the overhead rack 200 includes multiple maintenance spaces 220 in addition to a space where the multiple articles are stored. The maintenance space 220 refers to a space through which an operator enters the overhead rack 200. The operator may withdraw the article placed in the storage area 210 through the maintenance space 220 or perform a repair on the overhead rack 200 through the maintenance space 220.

The access passage 300 is connected to the number of maintenance spaces 220. The operator may access the multiple maintenance spaces 220 through the access passage 300. The access passage 300 is shown as extending in the first direction. However, the present disclosure is not limited thereto. The access passage 300 may have any shape that enables the operator to access the multiple maintenance spaces 220 through the access passage 300.

The first interface port 400 is installed on a ceiling of the fab and is disposed adjacent to the overhead rack 200. The first interface port 400 may be disposed on a side surface of the overhead rack 200, or may be disposed on top of the overhead rack 200. The first interface port 400 may be used to deliver the article to the transfer device installed on the ceiling (for example, an Overhead Hoist Transport (OHT) or another transfer vehicle moving on an overhead rail). The first interface port 400 may include, for example, a conveyor system for changing a position of the article. The conveyor system may move the article in a predetermined direction.

For example, the transfer vehicle 140 picks up the article from the overhead rack 200, moves the article, and puts the article on the first interface port 400. The first interface port 400 changes the position of the article using a conveyor system. Another transfer device OHT picks up the moved article.

In another example, another transfer device OHT puts the article on one side of the first interface port 400. The first interface port 400 changes the position of the article using a conveyor system. The transfer vehicle 140 picks up the moved article from the first interface port 400, and the transfer vehicle 140 puts the article on a designated location of the overhead rack 200.

In summary, the transfer vehicle 140 and another transfer device OHT may position the article using the first interface port 400. Even when the overhead rack 200 and the transfer device OHT are far apart from each other, the first interface port 400 disposed between the overhead rack 200 and the transfer device OHT may extend in an elongate manner. Therefore, a location where the overhead rack 200 is installed may be freely selected regardless of the position of the transfer device OHT.

The second interface port 500 may be installed on a bottom surface of the fab. The second interface port 500 may be installed under the overhead rack 200. The second interface port 500 may be used to transfer the article to the operator or an autonomous vehicle 510 (for example, an autonomous mobile robot (AMR) or an automated guided vehicle (AGV)). An upper surface of the second interface port 500 may be open. The transfer vehicle 140 may transport (e.g., load or unload) the article to and from the second interface port 500 through the open upper surface thereof.

For example, the transfer vehicle 140 picks up the article from overhead rack 200, moves the same, and puts the article down into the second interface port 500 through the open upper surface thereof. The operator or the autonomous vehicle 510 withdraws the article from the second interface port 500.

In another example, the operator or the autonomous vehicle 510 puts the article into the second interface port 500. The transfer vehicle 140 picks up the article through the open upper surface of the second interface port 500 and transfers the article.

Although the embodiments of the present disclosure have been described with reference to the accompanying drawings, the present disclosure is not limited to the above embodiments and may be implemented in various different forms. Those of ordinary skill in the technical field to which the present disclosure belongs will be able to understand that the present disclosure may be implemented in other specific forms without changing the technical idea or essential characteristics of the present disclosure. Therefore, it should be understood that the embodiments as described above are not restrictive but illustrative in all respects.

What is claimed is:

1. A ceiling storage system comprising:

a first support rail and a second support rail that extend in a first direction;

a first driving rail that extends in the first direction and is parallel to the first support rail and the second support rail;

a second driving rail movably coupled to the first support rail, the second support rail, and the first driving rail, wherein the second driving rail is configured to move along the first support rail, the second support rail, and the first driving rail;

a transfer vehicle movably coupled to the second driving rail and configured to move along the second driving rail; and a connection device that connects the first driving rail and the second driving rail to each other while being disposed between the first support rail and the second support rail, wherein the connection device and the second driving rail are rotatable together around a first axis that is parallel to the first direction.

2. The ceiling storage system of claim 1, wherein the connection device includes:

a fixed unit coupled to the first driving rail, a bushing rotatably coupled to the fixed unit and comprising a circular ring shape; and a rotatable unit coupled to the second driving rail and rotatably coupled to the bushing, wherein the rotatable unit and the second driving rail are rotatable around the first axis.

3. The ceiling storage system of claim 2, wherein the fixed unit includes:

a plurality of upper-end coupling members coupled to the first driving rail; and a connection member coupled to the plurality of upper-end coupling members and defining a hole, wherein the bushing is in the hole and coupled to the connection member.

4. The ceiling storage system of claim 2, wherein the rotatable unit includes:

a lower-end coupling member coupled to the second driving rail; and a shaft block coupled to the lower-end coupling member and comprising a circular protrusion, wherein the bushing is at least partially in the circular protrusion and coupled to the shaft block.

5. The ceiling storage system of claim 2, wherein the bushing is rotatable about the first axis.

6. The ceiling storage system of claim 2, wherein when a vertical level of the first support rail is higher than a vertical level of the second support rail in a second direction that is perpendicular to the first direction, the second driving rail is configured to rotate in a first rotational direction around the bushing.

7. The ceiling storage system of claim 2, wherein when a vertical level of the first support rail is lower than a vertical level of the second support rail in a second direction that is perpendicular to the first direction, the second driving rail is configured to rotate in a second rotational direction around the bushing.

8. A ceiling storage system comprising:

an overhead rack;

a first support rail and a second support rail that are on the overhead rack and extend in a first direction;

a first driving rail that is on the overhead rack, extends in the first direction, and is parallel to the first support rail and the second support rail;

a second driving rail movably coupled to the first support rail, the second support rail, and the first driving rail, wherein the second driving rail is configured to move along the first support rail, the second support rail, and the first driving rail;

a transfer vehicle movably coupled to the second driving rail, wherein the transfer vehicle is configured to move along the second driving rail and configured to transport an article to or from the overhead rack; and a connection device that connects the first driving rail and the second driving rail to each other while being disposed between the first support rail and the second support rail, wherein the connection device and the second driving rail are rotatable together around a first axis that is parallel to the first direction.

9. The ceiling storage system of claim 8, wherein the connection device includes:

a fixed unit coupled to the first driving rail, a bushing rotatably coupled to the fixed unit and comprising a circular ring shape; and a rotatable unit coupled to the second driving rail and rotatably coupled to the bushing, wherein the rotatable unit and the second driving rail are rotatable around the first axis.

10. The ceiling storage system of claim 9, wherein the fixed unit includes:

a plurality of upper-end coupling members coupled to the first driving rail; and a connection member coupled to the plurality of upper-end coupling members and defining a hole, wherein the bushing is in the hole and coupled to the connection member.

11. The ceiling storage system of claim 9, wherein the rotatable unit includes:

a lower-end coupling member coupled to the second driving rail; and a shaft block coupled to the lower-end coupling member and comprising a circular protrusion, wherein the bushing is at least partially in the circular protrusion and coupled to the shaft block.

12. The ceiling storage system of claim 9, wherein the bushing is rotatable about the first axis.

13. The ceiling storage system of claim 9, wherein when a vertical level of the first support rail is higher than a vertical level of the second support rail in a second direction that is perpendicular to the first direction, the second driving rail is configured to rotate in a first rotational direction around the bushing.

14. The ceiling storage system of claim 9, wherein when a vertical level of the first support rail is lower than a vertical level of the second support rail in a second direction that is perpendicular to the first direction, the second driving rail is configured to rotate in a second rotational direction around the bushing.

15. The ceiling storage system of claim 8, wherein the transfer vehicle includes:

a carriage movably coupled to the second driving rail and configured to move along the second driving rail; and a grip unit on the carriage and configured to transport the article to or from the overhead rack.

16. A ceiling storage system comprising:

a first support rail and a second support rail that extend in a first direction;

a first driving rail that extends in the first direction and is parallel to the first support rail and the second support rail;

a second driving rail movably coupled to the first support rail, the second support rail, and the first driving rail, wherein the second driving rail is configured to move along the first support rail, the second support rail, and the first driving rail;

a transfer vehicle movably coupled to the second driving rail and configured to move along the second driving rail; and a connection device that is on a center of the second driving rail and that connects the first driving rail and the second driving rail to each other, wherein the connection device includes:

a fixed unit coupled to the first driving rail, a bushing rotatably coupled to the fixed unit and comprising a circular ring shape; and a rotatable unit coupled to the second driving rail and rotatably coupled to the bushing, wherein the rotatable unit and the second driving rail are rotatable around the bushing.

17. The ceiling storage system of claim 16, wherein the fixed unit includes:

a plurality of upper-end coupling members coupled to the first driving rail; and a connection member coupled to the plurality of upper-end coupling members and defining a hole, wherein the bushing is in the hole and coupled to the connection member.

18. The ceiling storage system of claim 16, wherein the rotatable unit includes:

a lower-end coupling member coupled to the second driving rail; and a shaft block coupled to the lower-end coupling member and comprising a circular protrusion, wherein the bushing is at least partially in the circular protrusion and coupled to the shaft block.

19. The ceiling storage system of claim 16, wherein when a vertical level of the first support rail is higher than a vertical level of the second support rail in a second direction that is perpendicular to the first direction, the second driving rail is configured to rotate in a first rotational direction around the bushing.

20. The ceiling storage system of claim 16, wherein when a vertical level of the first support rail is lower than a vertical level of the second support rail in a second direction that is perpendicular to the first direction, the second driving rail is configured to rotate in a second rotational direction around the bushing.

* * * * *